United States Patent [19]

Taylor

[11] 4,096,008
[45] Jun. 20, 1978

[54] METHOD OF MANUFACTURE AND RETREADING OF TIRES

[75] Inventor: Don A. Taylor, Wadsworth, Ohio

[73] Assignee: Victor E. Buehrle, Akron, Ohio ; a part interest

[21] Appl. No.: 659,219

[22] Filed: Feb. 19, 1976

Related U.S. Application Data

[63] Continuation-in-part of Ser. No. 485,905, Jul. 5, 1974, abandoned.

[51] Int. Cl.² ............................................ B29H 17/36
[52] U.S. Cl. .................................... 156/96; 156/129; 156/275; 156/321; 156/322
[58] Field of Search ................ 156/96, 110 R, 123 R, 156/126–129, 324, 306, 394, 275, 320, 321, 322, 323

[56] References Cited

U.S. PATENT DOCUMENTS

| | | | |
|---|---|---|---|
| 1,216,654 | 2/1917 | Burke | 156/124 |
| 1,805,026 | 5/1931 | State | 156/96 |
| 2,907,365 | 10/1959 | McDonald | 156/129 |
| 2,976,910 | 3/1961 | Nowak | 156/96 |
| 3,294,606 | 12/1966 | Morgan et al. | 156/124 |
| 3,346,686 | 10/1967 | Collins | 156/306 |
| 3,364,091 | 1/1968 | Conti | 156/324 |
| 3,397,100 | 8/1968 | Christie | 156/321 |
| 3,464,873 | 9/1969 | Hawkinson | 156/96 |
| 3,563,832 | 2/1971 | Cooper | 156/405 |
| 3,607,497 | 9/1971 | Chrobak | 156/96 |
| 3,698,975 | 10/1972 | Hogan | 156/96 |
| 3,728,181 | 4/1973 | Simmons | 156/96 |
| 3,804,684 | 4/1974 | Tokushige et al. | 156/324 |
| 3,894,897 | 7/1975 | Batchelor et al. | 156/96 |

FOREIGN PATENT DOCUMENTS 853,659   10/1970   Canada ................................ 156/128

*Primary Examiner*—David Klein
*Assistant Examiner*—John E. Kittle
*Attorney, Agent, or Firm*—Reese Taylor

[57] ABSTRACT

An improved method of manufacturing or retreading pneumatic tires is disclosed wherein a precured tread component is bonded to a tire carcass or casing primarily by utilization of the residual heat in the precured tread component. The method includes the steps of molding or vulcanizing the tread in an apparatus such as a mold or other conventional type device designed to form and vulcanize a tire tread with or without the tread design. The method also includes providing the new tire carcass in finished form or a buffed casing, except for the tread, and conveying the precured tread at an elevated temperature to the tire carcass and applying the same thereon. In applying the tread to the carcass, the carcass is mounted on a mechanism capable of rotating the tire and precisely guiding the heated tread onto the carcass, and also includes stitching the tread to the carcass and using an intermediate bonding medium which is known in the trade as cushion rubber. Essentially the invention discloses utilization of the residual heat of the tread in the bonding zone to cure the cushion gum and effectuate a bond between the tread and the tire. Modifications of the invention are also disclosed wherein a prevulcanized tread strip is stored and subsequently reheated before application to the tire, as well as methods of preheating known re-enforcing material to create the bonding heat, as well as utilizing electric conductive means to accomplish the bonding of the tread to the carcass.

8 Claims, 10 Drawing Figures

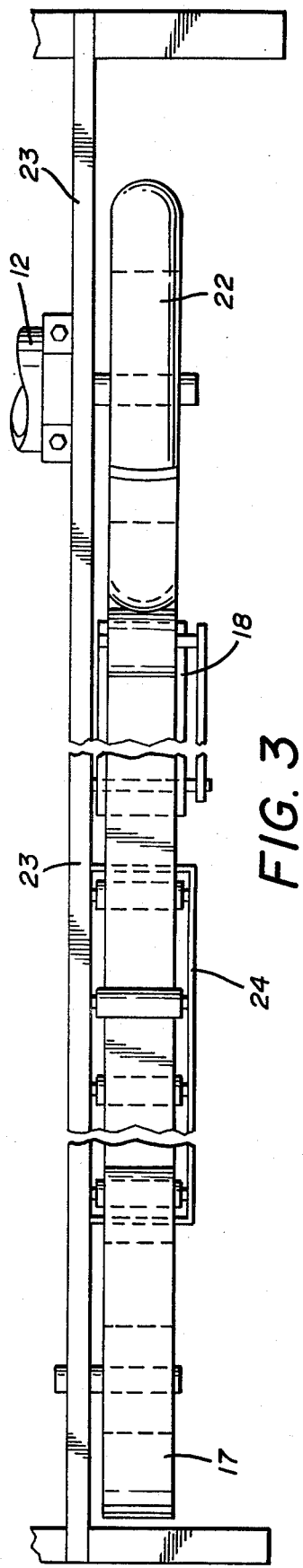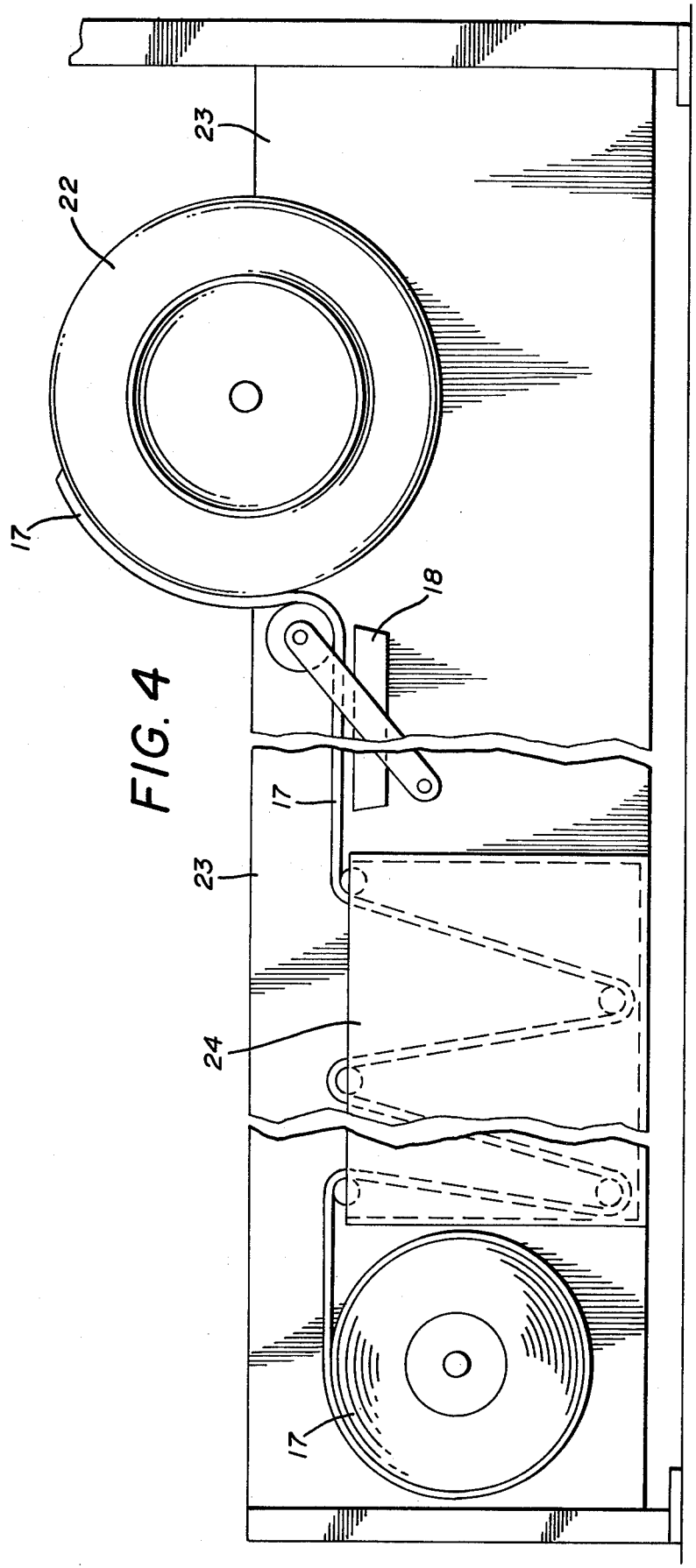

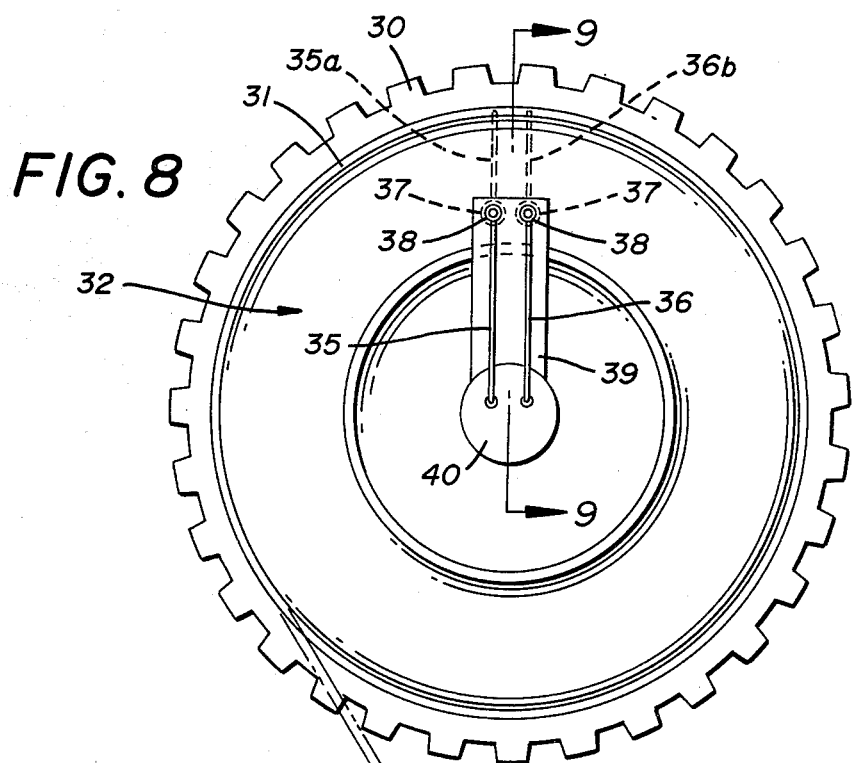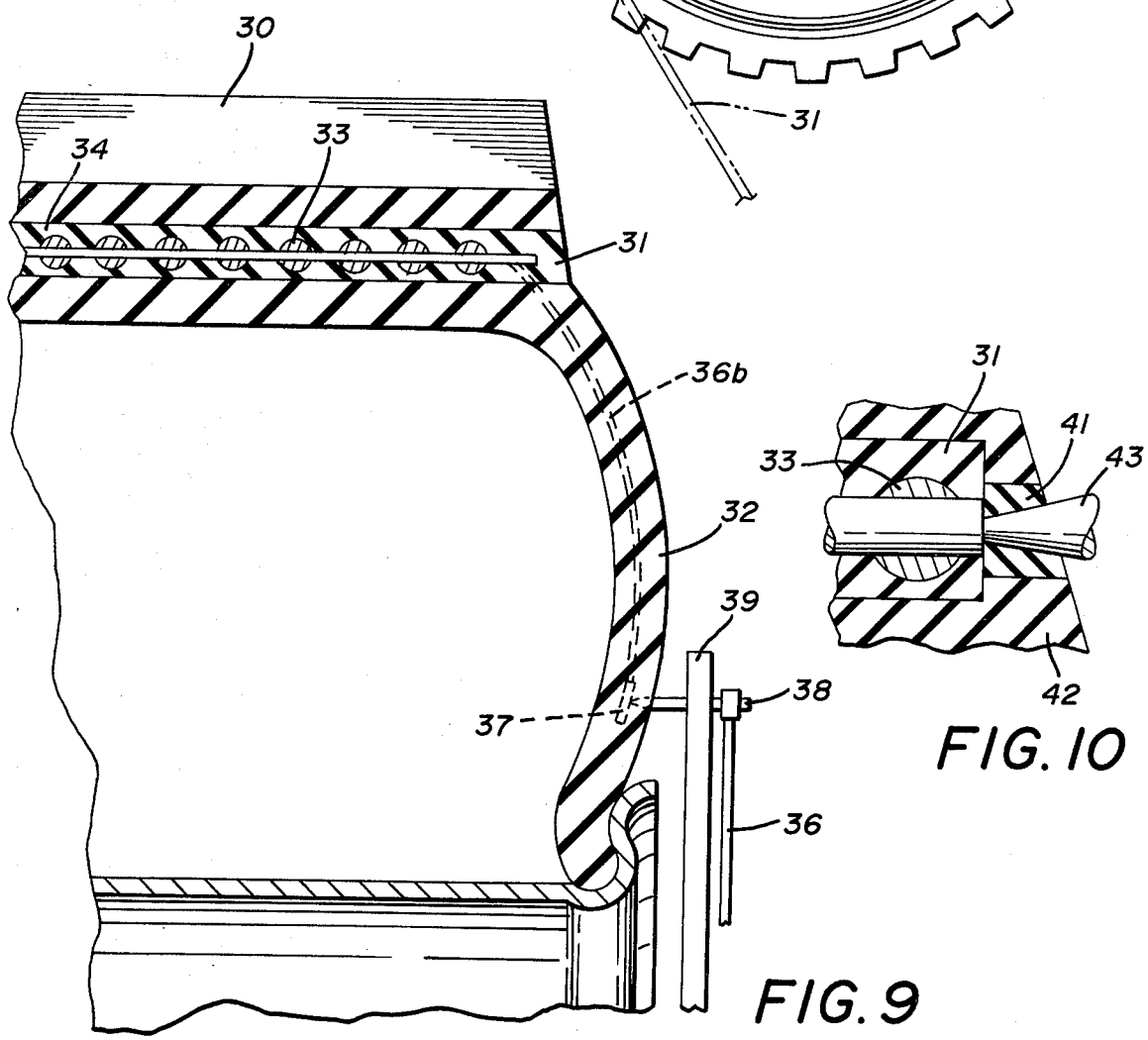

METHOD OF MANUFACTURE AND RETREADING OF TIRES

RELATED APPLICATIONS

This application is a continuation-in-part of Applicant's earlier filed application Ser. No. 485,905, filed July 5, 1974, entitled "Method of Manufacturing and retreading of Tires", now abandoned.

BACKGROUND OF THE INVENTION

This invention relates, in general, to a method for either retreading or manufacturing pneumatic vehicle tires and, in particular, relates to a method wherein essentially the residual heat of a precured tread is utilized to bond the tread to the carcass.

DESCRIPTION OF THE PRIOR ART

The following prior art patents are known to Applicant:
- Gammeter — U.S. Pat. No. 1,183,551
- Burke — U.S. Pat. No. 1,422,537
- Radford — U.S. Pat. No. 1,426,672
- Kilborn — U.S. Pat. No. 1,462,452
- Freeman — U.S. Pat. No. 1,555,196
- Hopkinson — U.S. Pat. No. 1,707,014
- State — U.S. Pat. No. 1,805,026
- Nowak — U.S. Pat. No. 2,976,910
- Morgan — U.S. Pat. No. 3,294,606
- Ragan — U.S. Pat. No. 3,472,714
- Cooper — U.S. Pat. No. 3,563,832
- Hogan — U.S. Pat. No. 3,698,975
- Simmons — U.S. Pat. No. 3,723,131
- Batchelor — U.S. Pat. No. 3,894,897

These prior art patents generally represent the known state of the art with regard to either retreading or applying a tread to a tire carcass or manufacturing a new tire. The art may be generally characterized as teaching the application of a precured tire tread to a tire carcass usually embodying the manual application of a cold tread to a cold tire carcass, following which vulcanizing is accomplished. Many of these references employ adhesives and most employ the utilization of conventional vulcanizing presses or autoclaves in order to accomplish the step of bonding.

SUMMARY OF THE INVENTION

The aforementioned prior art generally requires the use of rather large, expensive, and complicated machinery such as presses, autoclaves, etc. It also has the disadvantage of being relatively slow.

It has been discovered that a method utilizing the residual heat from a precured tread to accomplish the bonding of the tread to the tire carcass will overcome these disadvantages.

In the prior art, since rubber and elastomers are poor or inefficient conductors of heat, it has been found necessary to spend a good deal of time to cause the bonding heat to be conducted through the tread thickness. This also gives rise to another problem in that the tire carcass itself would normally be vulcanized at a much lower degree of heat than would be the tread due to the composition of the cords which are contained therein. Consequently, a finished new tire represents a compromise in that the actual vulcanizing temperature employed lies somewhere between the optimum high temperature required to vulcanize the tread stock and the lower temperature required to vulcanize the carcass. Also, in retreading it is necessary to employ lower temperatures to avoid damage to the casing. Therefore, employment of the lower temperatures requires application of the heat for longer periods such as sixty minutes or more in retreading, for example.

This disadvantage is overcome in the instant method by utilizing a precured carcass or casing and a precured tread and further utilizing the residual heat in the tread to cause the tread to be bonded to the carcass using conventional cushion gum stock placed between the tread and tire as the bonding agent. This bonding takes place nearly instantaneously, with bonding time periods of somewhere in the range from two to fifteen minutes being achievable. This result obviously represents a tremendous advance in the time required to retread an old tire or construct a new tire, and further represents an economic saving in that the conventional costly and space-consuming vulcanizing apparatuses of the prior art are not required.

Accordingly, production of a method of retreading or manufacturing a pneumatic tire having the above-noted characteristics becomes the principal object of this invention, with other objects thereof becoming more apparent upon a reading of the following brief specification, considered and interpreted in view of the accompanying drawings.

OF THE DRAWINGS

FIG. 3 is a plan view of the apparatus of FIG. 2.

FIG. 4 is a side elevational view of yet another apparatus for carrying out another modification of the method.

FIG. 8 is a side elevational view showing yet another modification.

FIG. 9 is a sectional view taken along the line 9—9 of FIG. 8.

FIG. 10 is an enlarged fragmentary sectional view.

BRIEF DESCRIPTION OF THE PREFERRED EMBODIMENTS

Figure 1:
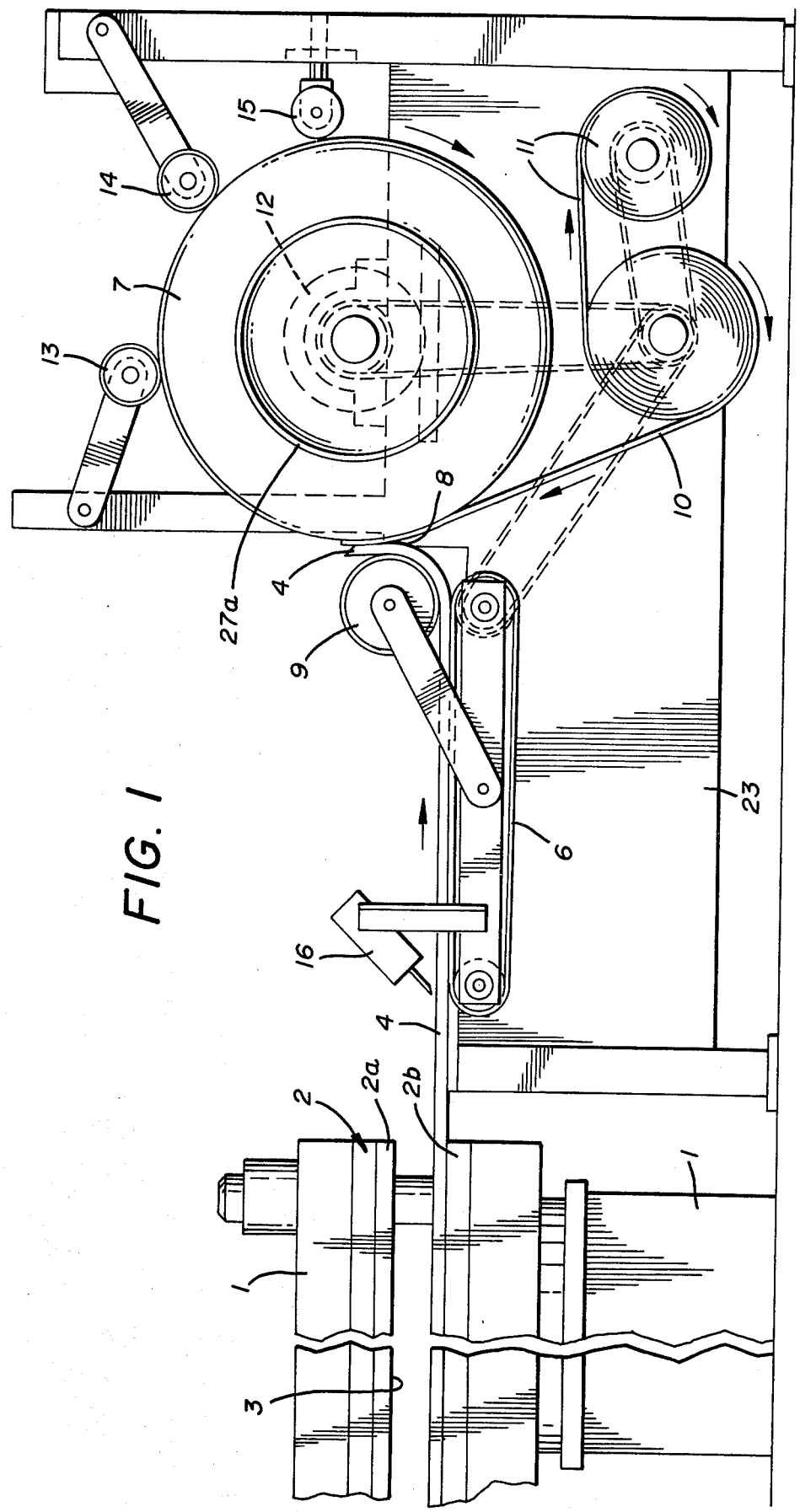
FIG. 1 is a side elevational view of the apparatus required to carry out the principal method of the invention.

Referring first to FIG. 1, the method embodying the invention requires the utilization of certain apparatus shown in FIG. 1. Thus, a molding apparatus 1 having a mold 2 capable of imparting a tread configuration 3 is employed. This molding apparatus has heating means and a pressure clamping means to form and vulcanize a tread strip 4. This particular molding apparatus is not disclosed in greater detail since it is believed that there are known structures in the art capable of performing this function.

Furthermore, it should be noted that all variations of the invention are not necessarily intended to be limited to molded treads but could be utilized with extruded treads as well, although use of an extruder would require extra steps in the method as will be described below.

After the mold 1 is filled with raw or unvulcanized rubber or elastomeric material 4, the material is confined under molding pressures at vulcanizing temperatures for the required vulcanizing time period. Following that, the hydraulic pressure on the press is released and the press opens committing the mold 2, which usually comprises two halves 2a and 2b, to separate. The pressure being relieved permits the hot, at least partially vulcanized tread to be withdrawn from the mold.

A moving and conveying means 6 conveys the tread 4 to the tire carcass 7 and into the bite of a pressure roll 9. A cushion stock bonding strip 10 is then also fitted into the pressure roll 9. Since the cushion strip has a high degree of tackiness, it is provided with a plastic or other material liner 11 to prevent it from sticking to itself during storage. The material roll spindles, conveyor device, and tire carcass, and the rim spindle are carried by side plate frame 23. The cushion strip may be applied to the tire simultaneously with the tread or before the tread is applied, as desired.

This permits the tire carcass to be rotated by a suitable drive mechanism 12 attached to a tire rim 27a and having aligning and pressure rolls 13 and 14 which will assist in bonding the hot tread 4 to the tire carcass 7.

An important aspect of the invention is that the required vulcanizing and bonding heat which comes from the residual heat of the tread is provided in the interior bonding zone of the tread and the carcass rather than exteriorly, as is the case in the prior art. Since rubber has a natural insulating characteristic, this is a distinct advantage. Thus, the heat is concentrated at the bonding point until the required near instant vulcanization and bonding of the components is achieved. The time period is regulated by the natural heat loss rate of the rubber or the time exposure of the tire assembly to cooling air to control the vulcanization.

A necessity exists for a scored splice at the two ends of the tread strip, and a lineal measurement device 15 is provided and is activated upon rotation of the tire carcass 7. This device records the precise circumferential dimensions of the carcass and electronically feeds the data to a cutting device 16 which severs the tread strip to the precise length required to conform to the circumference of the tire.

It should be noted here that the cushion gum material employed is of any known composition and the invention is not intended to be limited to the use of any particular compound of cushion gum stock. It should also be noted at this point that no adhesive per se is required, with the cushion stock, when heated, being "tacky" in and of itself and serving as the bonding component between the tread strip and the tire carcass.

There are several additional advantages arising from these facts. First, elimination of highly volatile adhesives definitely provides a much safer working environment. Second, where adhesives have been employed, there is a high degree of risk with regard to tire failure in use. Third, the ability to use any conventional cushion gum eliminates the need to use expensive, specially compounded gum stock.

Furthermore, while the tread has been described as being precured, it will be understood that it may not be completely cured, but it should be brought up to just above the scorch point, which will of course vary with the compound of the rubber being used, and below the optimum cure temperature, and with the remainder of the cure taking place on the tire carcass itself. The preferred temperature for the tread is just above the scorch point for the tread stock, but in any event at least equal to the required vulcanizing temperature of the cushion gum stock. The precise temperatures will vary but will be known to those skilled in the art based upon the materials being used and the above description.

Figure 2:
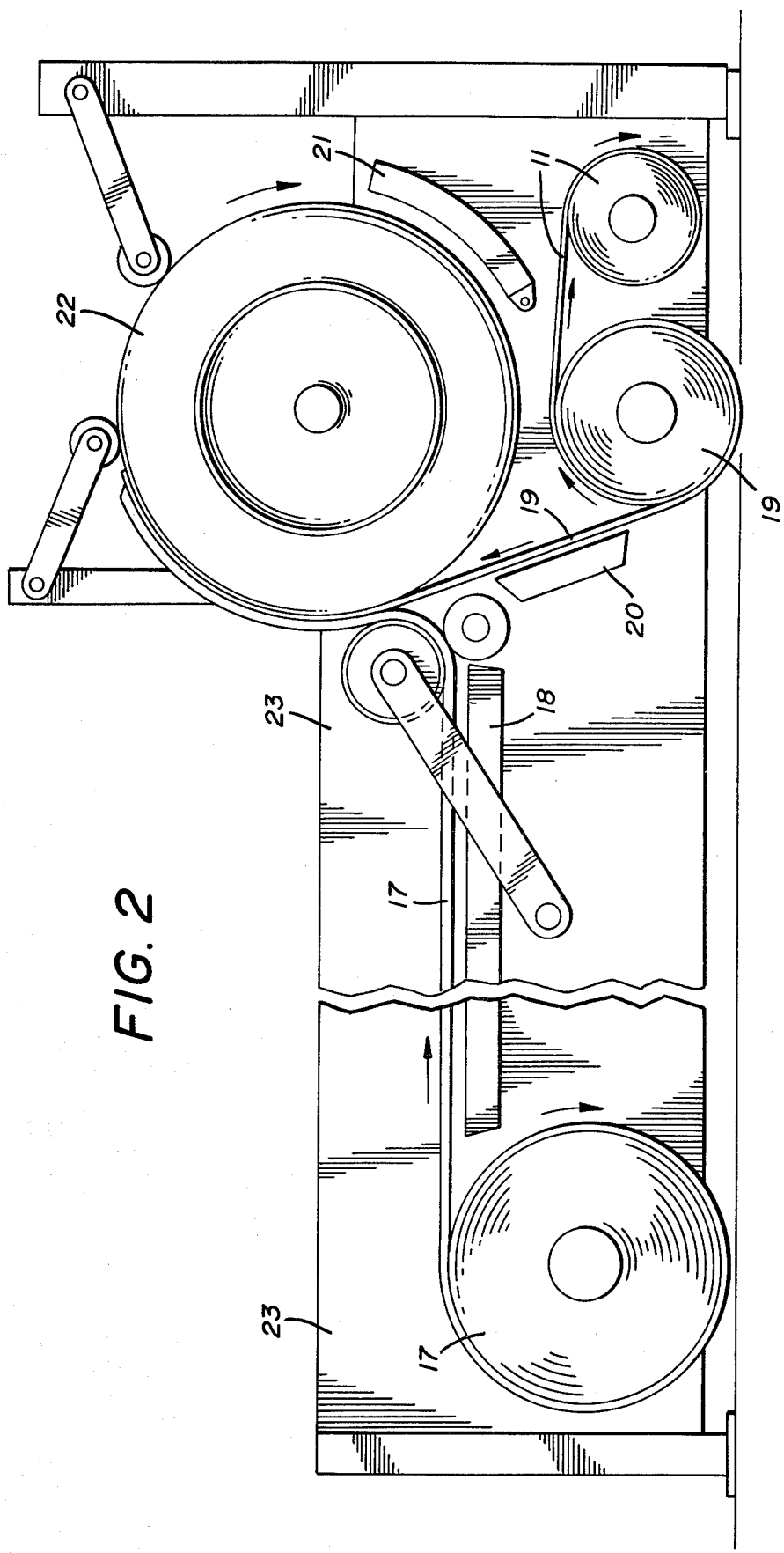
FIG. 2 is a side elevational view of another embodiment of the apparatus necessary to carry out a related method.

Referring to FIG. 2, a modified method is disclosed as is a modified apparatus for carrying out that method. In this view of FIGS. 2 and 3, the tread strip 17 is provided in a precured but unheated state. The strip is then heated in this form of the invention by passing it over an infra-red or other suitable heating device 18. The adhesive cushion strip 19, in this form of the invention, may also be provided with a similar heating means 20 and 21 which heats the strip and the tire carcass itself, although this is optional.

It has been found that the infra-red heating means cannot provide means to vulcanize the rubber material, but it can provide a fast, efficient heating of the surfaces of the components of the tire.

With regard to the modification of FIGS. 3 and 4, since the vulcanizate, upon cooling, shrinks dimensionally, means are provided to compensate for this which include an air-cooled accumulator and a heat sink device 24 which can lower the tread temperature, which can be as high as 400° F. coming from a mold, for example, to a temperature of about 325°–350° which is more suitable for the bonding process. Also, heating means 18 can be used to stabilize the temperature just before application to the carcass.

It is true in all cases of the various embodiments of the invention that the readily recognizable advantage is that precise and quick localization of the required heat at the bonding point is achieved by the method in contrast to the existing methods requiring the conductive heat soaking of the heat due to its totally exterior application point on the tire and tread.

Figure 6:
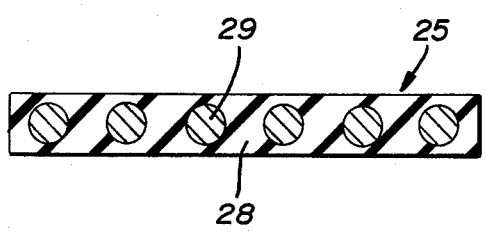
FIG. 6 is a sectional view taken along line 6—6 of FIG. 5.
Figure 5:
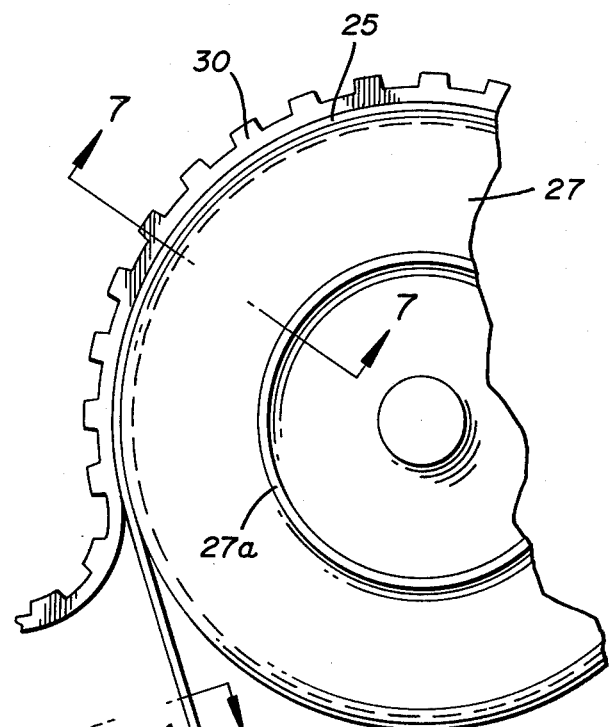
FIG. 5 is an enlarged fragmentary view of a still further modified apparatus.
Figure 7:
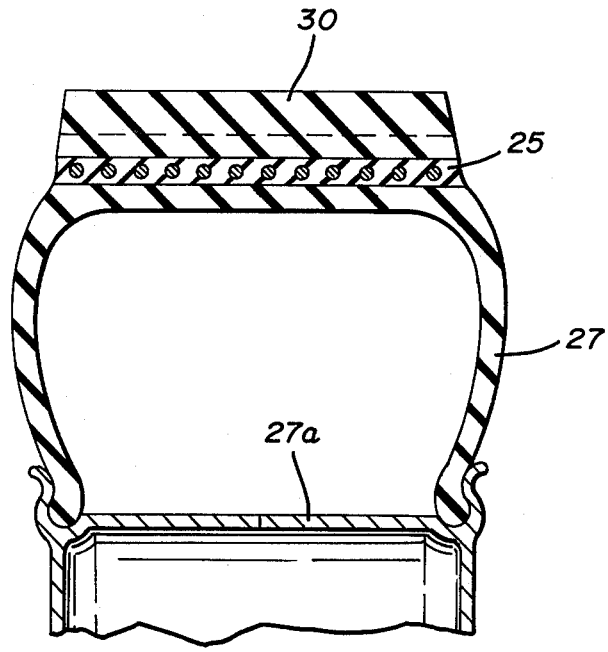
FIG. 7 is a sectional view taken along line 7—7 of FIG. 5.

FIGS. 5, 6, and 7 illustrate another method wherein the tread feed is similar to FIG. 1 in that it feeds either a heated or cooled precured tread strip 4 into the pressure roll bite 9. In this case, a conventional reinforcing metal wire belt 25 is comprised of wire strands 29 embedded or calendered into the rubber 28 such as shown in FIG. 6. The metal belt is heated by a penetrating infra-red device 18 which very quickly brings the belt up to the necessary vulcanization temperature due to the much faster heat conductivity of the steel wire.

The preheated belt 25 being fed into a central position between the tire tread 30 and carcass 27 very quickly bonds one to the other causing a very high strength molded relationship between the components. Again, it is important to note that a very much reduced time factor is achieved by this method due to the point of application of the heat adjacent the bonding surface.

FIGS. 8, 9, and 10 illustrate another embodiment of the invention showing a tire 32 constructed with a metal belt 31, of the type used with both radial and bias ply tires, located between tread 30 and carcass 32. In this version of the invention, the belt is used as a conventional tire re-enforcement component to add additional strength to the tire as is common practice.

With regard to FIG. 9, the invention illustrates that the belt 31 being of steel wire 33 or any electrically conductive material, and encased in an elastomeric material 34 which can also effectively serve as insulation, combined with the natural electrical conductivity of the steel wire, makes it possible for the belt assembly to function efficiently as a resistant type heating element to provide vulcanizing heat internally, thereby bonding the components of the tire together when electrified by the connection of the two electrical leads 35 and 36 to an electrical power source.

Electrical leads 35a and 36b carry the current to the belt 31 by contact needles 38, thereby establishing the necessary conductive contact with the buttons 37. A bracket 39 provides a support for the contact pins.

With specific regard to the method of FIGS. 8 and 9, the belt 31 and the electrical lead wires 35a and 36b are assembled to and in the tire at the time of building of the tire carcass 32.

FIG. 10 illustrates an alternative method wherein a belt is encased by a tread 42 and the tire carcass 42. An electrical contact needle 43 contacting a suitable connection on the belt 33 provides the required electrical power and heat. A plug 41 of a self-sealing elastomeric material is provided to close the opening made by the needle.

It should be noted with regard to this version of the invention that the tire construction is such that each tire will have an additional independent vulcanization means to bond the tread to the carcass which is in the form of the now commonly used re-enforcing component belt of the tire at no additional cost in materials.

It has accordingly been shown how, by means of the improved method of this application, substantial savings in both time and money can be achieved. Time is saved by virtue of the fact that the carcass and the tread being precured, the actual bonding time for bonding the tread to the carcass is severely reduced. Also, the fact that the bonding heat is utilized at the point of bonding rather than externally results in greatly reduced bonding time. By the same token, money is saved in that the costly presses, autoclaves, etc., of the prior art are no longer necessary.

While a full and complete description of the invention has been set forth in accordance with the dictates of the patent statutes, it should be understood that modifications can be resorted to without departing from the spirit thereof or the scope of the appended claims.

Thus, while as noted, no specific composition or compound for the cushion gum stock is disclosed, any suitable commonly used cushion gum stock will be acceptable and workable.

Similarly, as noted above, while no specific temperature for the pre-vulcanization of the tread stock is described, it should be noted that the temperature will be just above scorch point for the compound involved and just below the optimum bonding temperature for that stock, but in any event at least equal to the required vulcanizing temperature of the cushion gum stock.

It should also be noted that, as described, the invention is equally applicable to the retreading or manufacture of new tires. In this regard the terms "carcass" and "casing" have been used interchangeably herein, although commonly "carcass" is used with regard to a new tire and "casing" to a retread.

What is claimed is:

1. A method of securing a tire tread to a tire carcass comprising the steps of
   (A) at least partially pre-curing a tread strip in a suitable apparatus;
   (B) applying a strip of cushion gum material to the periphery of an adjacently disposed tire carcass;
   (C) transporting said tread strip to said tire carcass;
   (D) applying said tread strip to the periphery of said tire carcass;
   (E) applying bonding heat at the interface of said cushion gum material, said tread strip and said tire carcass at least sufficient to vulcanize said cushion gum material to said strip and said tire carcass;
   (F) said tread strip being heated to a temperature at least as great as the temperature required to vulcanize said cushion gum material; and
   (G) said tread strip being applied to said tire carcass in said heated condition to supply said bonding heat.

2. The method of claim 1 further characterized by the steps of
   (A) rotating said tire carcass as said tread strip is applied thereto;
   (B) predetermining the required lineal length of said tread strip in response to the rotational movement of said tire carcass; and
   (C) cutting said tread strip to the required length.

3. The method of claim 1 wherein said bonding heat is applied at the area of contact between said tread strip, said cushion gum material and said tire carcass by utilizing the residual heat from said tread strip.

4. A method of securing a tire tread to a tire carcass comprising the steps of
   (A) at least partially pre-curing a tread strip in a suitable apparatus;
   (B) cooling and preshrinking said tread strip after its partial precure;
   (C) applying a strip of cushion gum material to the periphery of an adjacently disposed tire carcass;
   (D) reheating said tread strip to a temperature at least sufficient to vulcanize said cushion gum material;
   (E) applying said tread strip to the periphery of said tire carcass in overlying relationship to said cushion gum material and in said heated condition to supply at least a portion of the heat required to vulcanize said cushion gum material to said carcass and said tread strip with no heat being supplied during bonding from external sources to the assembled tire.

5. The method of claim 4 further characterized by the step of
   (A) heating said strip of cushion gum material before applying said strip to said tire carcass.

6. The method of claim 4 further characterized by the steps of
   (A) heating said strip of cushion gum material before applying said strip to said tire carcass; and
   (B) heating said tire carcass prior to the application of said tread strip and said cushion gum strip thereof; and
   (C) assembling said tread strip, said cushion gum material and said tire carcass in said heated condition.

7. The method of claim 1 further characterized by the step of
   (A) applying a strip of preheated reinforcing belt material between said tread strip and said tire carcass.

8. A method of securing tire tread material which is at least partially precured to a tire carcass comprising the steps of
   (A) applying a strip of cushion gum material to the periphery of the tire carcass;
   (B) applying the tread material to the periphery of said tire carcass over said cushion gum material;
   (C) applying bonding heat at the interface of said cushion gum material, said tread strip and said carcass at least sufficient to vulcanize said cushion gum material to the contracting surfaces between said tread material, said tire carcass and said cushion gum material;

(D) heating said tread material prior to application to the carcass with said bonding heat that is applied at the interface of said tread material, said tire carcass and said cushion gum material being the residual heat from said tread material.

* * * * *